Patented Feb. 7, 1939

2,146,060

UNITED STATES PATENT OFFICE 2,146,060

PROCESS OF MAKING HYDROXYLAMINE AND MANDELIC ACID

Carleton Ellis, Montclair, N. J., assignor to Standard Oil Development Company, a corporation of Delaware No Drawing. Application July 29, 1937,
Serial No. 156,337

6 Claims. (Cl. 260—520)

This invention has for its purpose the simultaneous production of hydroxylamine and alpha-hydroxy-carboxylic acids. It is particularly applicable to the preparation of hydroxylamine and mandelic acid.

The present invention comprises the condensation of aldehydes (aliphatic, cycloparaffinic, aromatic, or substituted) with a primary aliphatic nitro compound (nitromethane), to produce nitro-alcohols or substituted nitro-alcohols, followed by subsequent hydrolysis of said nitro-alcohols, using acid hydrolytic agents, to hydroxylamine or its salts, and alpha-hydroxy-carboxylic acids or substituted alpha-hydroxy-carboxylic acids.

Furthermore, this invention relates to the use, as starting materials, of intermediates which may be derived from petroleum hydrocarbons.

The products obtained by the process of this invention are important and highly desirable materials. Mandelic acid, for example, is used very extensively in the medical profession for combating infections of the kidneys and of the genito-urinary tract, which in turn result from the ravages of the micro-organisms Bacillus colon which normally inhabits the intestinal tract. In view of the fact that the kidney and urinary tract are very inaccessible for direct treatment it is necessary to attack these ailments by indirect courses. It has been found that mandelic acid and closely related materials have the ability, when ingested orally, of being carried by body fluids to the affected regions, in which regions the mandelic compounds cause a sufficient lowering of pH, or increase in acidity, so as to render the harmful Bacilli coli germs innocuous. The acidity produced in this manner is sufficient to kill infectious organisms, but not strong enough to cause tissue deterioration.

Hydroxylamine, on the other hand, is very important both in chemistry and in the medical profession. In the former case it finds use as a reducing agent in analytical work, for example, in the determination of gold, silver and mercury, and the like, as an intermediate in chemical synthesis, for example, in the preparation of dimethyl glyoxime which is an important chemical reagent, and for many other purposes. In the medical profession it is of considerable therapeutic value from the standpoint of being effective as an antiseptic or germicide, and is also used in the treatment of certain skin diseases, such as chronic psoria., lupus, itch, herpes, and other dermatological ailments. In addition to the above uses hydroxylamine finds further use as an important photographic developer.

The process in use at the present time for the production of mandelic acid consists in condensing benzaldehyde with hydrogen cyanide gas, or of reacting the benzaldehyde-sodium bisulphite condensation product with sodium cyanide, to produce mandelonitrile, $C_6H_5 \cdot CHOH \cdot CN$, which in turn is hydrolyzed to mandelic acid. This method, however, possesses several very serious disadvantages, namely: (1) The use of hydrogen cyanide (prussic acid) or metallic cyanides presents a very dangerous health hazard, both from the standpoint of carrying out the reaction and also of obtaining mandelic acid sufficiently free of cyanides to be used medicinally; (2) the cost of preparing hydrogen cyanide is considerable in comparison to nitromethane which may be manufactured from petroleum hydrocarbons at a very low cost; (3) the intermediate formed by the condensation of benzaldehyde with hydrogen cyanide, mandelonitrile, is a very unstable compound and must be utilized as quickly as formed in order to obtain suitable yields of final product. This mandelonitrile, $C_6H_5 \cdot CHOH \cdot CN$, readily undergoes a rearrangement to the isonitrile, $C_6H_5 \cdot CHOH \cdot NC$, which (as is well known) cannot be hydrolyzed to mandelic acid. In contrast to this, the nitroalcohols formed as intermediates in the reaction set forth by the present invention, are quite stable and may be kept without appreciable decomposition; (4) the hydrolysis of mandelonitrile must be carried out in the cold (consequently necessitating a long reaction time) in order to obtain a product of suitable color. If this hydrolysis is carried out at higher temperatures, the mandelic acid obtained is highly colored, this color being very persistent and thereby offering difficulty in refining operations. Even when hydrolysis is carried out in the cold, the product is deeply colored and must be allowed to stand in the air and light for at least twenty-four hours before the refining operation is begun, offering an additional obstacle; (5) the crude mandelic acid obtained by the benzaldehyde-hydrogen cyanide reaction is highly contaminated with ammonium chloride, from which it is difficult to separate; (6) the mandelonitrile reaction furnishes no valuable by-product as is the case in the present invention by which useful and desirable hydroxylamine is produced; (7) a much longer time is required by the benzaldehyde-hydrogen cyanide reaction for producing mandelic acid than is required by the process of the present invention.

The present invention provides a reaction which is easily manipulated and which furnishes two highly desirable products, each of which may be easily obtained in a high state of purity free from objectionable color.

The initial materials utilized according to this invention may, as mentioned hereinbefore, be made from petroleum hydrocarbons. Benzaldehyde, which is a common everyday chemical, can be made by any of the following, and various other, methods. For example, toluene may be treated in the vapor phase, and in the presence of suitable catalysts, with air or other oxygen-containing gas, such as nitrogen tetroxide, to produce benzaldehyde. Or, the oxidation of toluene may be carried out in the liquid phase using as the active oxidizing agent such materials as chromic acid, permanganates, manganese dioxide, and the like. Benzaldehyde may also be prepared from toluene, by subjecting the latter material to chlorination in the presence of sunlight and hydrolyzing the benzyl chloride thus formed. Still other methods for producing this aldehyde consist in reacting carbon monoxide with benzene in the presence of hydrogen chloride and aluminum chloride, or by reacting chromyl chloride with ethyl benzene.

Nithromethane, on the other hand, which is a stable, colorless, non-explosive liquid of pleasant odor, and which can be distilled under normal pressures without noticeable decomposition, is a safe chemical and is relatively non-toxic. Its vapors have been found to be less toxic to mammals than the vapors of many of the common solvents such as benzene, carbon tetrachloride, and the like. From petroleum it can be derived by means of the direct vapor-phase nitration of the gaseous paraffin hydrocarbons such as ethane and propane, using nitric acid vapor or the oxides of nitrogen, for example, nitrogen tetroxide. Another method for producing this nitro compound consists in treating methane gas with chlorine in the presence of light and subsequently reacting the methyl chloride with a metallic nitrite, as for example, silver nitrite, the products of the latter reaction being nitromethane, along with some methyl nitrite, and silver chloride.

This invention possesses the further advantage that aldehydes in general may be employed, aldehydes suitable for my purpose comprise not only those derived from aliphatic, aromatic, or cycloparaffinic hydrocarbons, but also alkyl, aryl, or aralkyl derivatives of such aldehydes as well as their nitro-, halo-, sulphonyl-, hydroxyl-, and other substitution products. The substituent groups may be present either in the ring or on the hydrocarbon chains and in the case of the aromatic and cycloparaffinic aldehydes, the aldo grouping may be either attached directly to, or separated by one or more alkyl groups from, the cyclic nucleus.

According to the present invention the reaction may be carried out by mixing the reactants (nitromethane and an aldehyde) at room temperature or below in a suitable solvent, or if desired, at higher temperatures, using as catalyst an alkaline material (e. g., potassium hydroxide, sodium metal, caustic soda, and the like), and allowing the reaction to proceed. Although alkaline catalysts are preferred, acidic or neutral catalytic materials may be used if desired. Condensation ensues readily and the resulting nitro-alcohol may then be isolated by precipitation with water or other suitable means. In case an alkaline catalyst is employed the nitro-alcohol is often obtained as its sodium salt (sodium nitrolate). In such instances, the free compound (alcohol) may be secued by direct acidification. Although any one of numerous acids (e. g., hydrochloric or sulphuric) may be used, acetic acid is preferred for this purpose. By using the proper proportions of reactants, and adding the aldehyde to the nitro compound, the intermediate product resulting will consist principally of nitro-alcohols with negligible quantities of nitro-glycols. The nitro-alcohols thus obtained are afterwards subjected to acid hydrolysis. By the term acid hydrolysis is meant subjecting the nitro-alcohol to the action of a concentrated aqueous solution of an acid, as for example, hydrochloric acid. This latter step (acid hydrolysis) may be carried out at room temperature or at elevated temperatures, and/or pressures, whereupon is obtained mandelic acid, or a derivative or homologue thereof, along with hydroxylamine hydrochloride which is usually present in the cooled hydrolysis mixture as lustrous white crystals of high purity. When benzaldehyde and nitromethane are the starting materials, the reactions may be represented as follows:

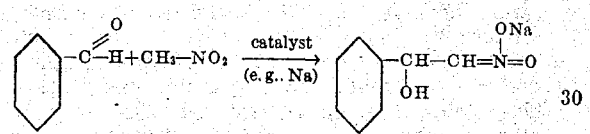

Benzaldehyde nitromethane

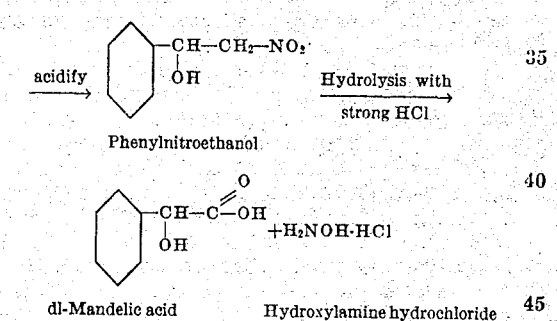

dl-Mandelic acid      Hydroxylamine hydrochloride

The hydrolysis may, depending on the nature of the intermediate nitro-alcohol, require temperatures in the range of 100°–125° C. In such cases the nitro-alcohol is mixed with the acid hydrolyzing agent in a suitable reaction vessel, said vessel being constructed for operation under elevated pressures such as would be developed by the reaction under the conditions employed. The reaction vessel, which may consist, for example, of a pressure autoclave of acid resistant material or of enamel- or glass-lined construction, may or may not be equipped with a stirring device, as desired. After the reaction period the hydrolysis product is removed from the autoclave and the desired materials separated therefrom. In case hydrochloric acid is employed as the hydrolysis agent, some alpha-chlorocarboxylic acid may result (in the case of benzaldehyde and nitromethane some phenyl alpha-chloroacetic acid may be found in the product along with mandelic acid) along with the corresponding alpha-hydroxycarboxylic acid. However, the alpha-chloroacids are quite easily converted (in subsequent operations), in presence of water or very dilute alkali, to the corresponding hydroxy-acids.

The main hydrolysis mixture, from which white crystals of hydroxylamine hydrochloride separate on cooling, may be fractionated in any one of several ways. One procedure is as follows: Most of the hydroxylamine hydrochloride may preferably be separated, in a high state of purity, by raking or other mechanical means. The remainder of the hydrolysis product may be diluted with water, neutralized with dilute caustic soda to dissolve carboxylic acids, and then warmed gently to convert any chloro-acids which might be present to hydroxy acids. The solution is then filtered to remove any small amount of oily unhydrolyzed nitroalcohol. The removal of a possible yellowish color from the resulting solution may then be accomplished in either of two ways, as desired. A small amount of decolorizing carbon, animal or vegetable charcoal, fuller's earth, or other decolorizing material may then be added to the solution of sodium carboxylate, the mixture heated for a short time, filtered, and then acidified to liberate the carboxylic acid. This procedure is to be preferred in case the free hydroxy-acid is of limited solubility in water. In case, however, the hydroxy-acid is easily soluble in warm or hot water, the acidification to release the free carboxylic acid may be made prior to the decolorization step. The above clarification treatment gives a solution possessing very little or no color, from which, by cooling and/or partial evaporation of solvent, crystals of the desired hydroxycarboxylic acid of high purity are obtained. In case the final acid should not possess the proper solubility in water to enable its separation and purification by the above treatment, other solvents such as alcohol, or ether, etc., may be substituted wholly or in part, for water, as the solvent medium. It is intended that the above procedure may be modified whenever necessary, depending upon the characteristics of the individual materials concerned, without deviating from the limits of this invention. As an illustration: in the preparation of substances such as lactic acid, from acetaldehyde and nitromethane, according to the present invention, said acid may be too soluble in water to be separated by the above means. In such cases, other solvents or even distillation may be resorted to in order to isolate the desired products.

The following typical examples will serve to illustrate my invention.

*Example 1.*—To 350 parts by weight of anhydrous methanol were added, in portions, 23 parts by weight of sodium metal. This was followed by the addition of 61 parts by weight of nitromethane, the temperature being maintained at about room temperature, whereupon a thick suspension resulted. To this were then added, in portions and with good mixing, 106 parts by weight of benzaldehyde. After being agitated for a few minutes the suspension of solid matter (the sodium salt of phenylnitroethanol) was thinned with water, whereupon a homogeneous solution resulted. Diluted acetic acid was then added and the free phenylnitroethanol which separated was recovered by decantation. The yield was 133 parts by weight or 80 per cent of the theoretical. This reddish oil appeared to be quite stable on standing for considerable periods, especially if kept in a cool place. It possessed a specific gravity of about 1.21.

*Example 2.*—A mixture of 5 parts by weight of phenyl-nitroethanol as obtained from Example 1, and 11 parts by weight of fuming hydrochloric acid (saturated at 0° C. to +5° C.), was sealed in a thick-walled Pyrex tube. This reaction tube was then inserted into an oven and maintained at 110° C. for 6 hours. On cooling to room temperature the tube was found to contain a heavy brownish gummy mass, above which was a clear, slightly yellow, aqueous layer in which were lustrous white crystals of hydroxylamine hydrochloride. This latter material was separated by mechanical means and was found to melt at 148° C. (theoretical 151° C.). The remainder of the hydrolysis product was thinned with water and the carboxylic acids dissolved by the addition of caustic soda. The alkaline solution was then warmed gently (in order to hydrolyze any alpha-chloro acids which may have been present) and filtered free of a small amount of brownish oil, presumably unhydrolyzed nitroalcohol. The clear filtrate was then heated for a short time with a small amount of decolorizing carbon, in order to remove a slight yellow color possessed by the solution, and afterwards filtered free of carbon particles. The filtrate was acidified with hydrochloric acid, while still warm, and then allowed to cool. In this manner a crop of white crystals of dl-mandelic acid of melting point 118° C. (theoretical 118.1° C.) was obtained. The aqueous mother liquor was then extracted with a small portion of diethyl ether. By slow evaporation of the latter several additional small crops of mandelic acid (melting point 118° C.) were obtained. The total yield of purified dl-mandelic acid amounted to 3.2 parts by weight (71 per cent yield on phenyl-nitroethanol; 57 per cent yield on benzaldehyde). The mandelic acid thus obtained was shown by a color test with sodium nitroprusside to be free of hydroxylamine.

It will be seen from the foregoing that my invention contemplates condensation of nitromethane with an aldehyde to give a nitro-alcohol. The aldehyde employed may be derived from an aliphatic, aromatic, or cycloparaffin hydrocarbon. Another step in my invention comprises the hydrolysis of such a nitro-alcohol, preferably in an acid medium, to an alpha hydroxycarboxylic acid and hydroxylamine, the latter being recovered as a salt of the acid employed in the hydrolytic operation. As indicated previously, this latter step involves a rupture of the nitro-alcohol to give two products (hydroxycarboxylic acid and salt of hydroxylamine) both of which may find applications in many various ways.

What I claim is:

1. The process which comprises condensing an aldehyde with nitromethane and subjecting the condensation product to acid hydrolysis.

2. The process which comprises condensing an aldehyde with nitromethane whereby a nitro-alcohol is produced, and subjecting said nitro-alcohol to acid hydrolysis whereby an alpha hydroxycarboxylic acid and a hydroxylamine salt are obtained.

3. The process which comprises condensing an aldehyde with nitromethane whereby a nitro-alcohol is produced, subjecting said nitro-alcohol to acid hydrolysis whereby an alpha hydroxycarboxylic acid and a hydroxylamine salt are obtained, and separating said hydroxylamine salt from said alpha hydroxycarboxylic acid.

4. The process, according to claim 3, in which the aldehyde is benzaldehyde.

5. The process according to claim 3 in which the aldehyde is an aromatic aldehyde.

6. The process according to claim 3, in which acid hydrolysis is effected with hydrochloric acid.

CARLETON ELLIS.